United States Patent [19]

Knepper

[11] Patent Number: 4,537,260
[45] Date of Patent: Aug. 27, 1985

[54] APPARATUS WITH REAR AND FRONT POWER LIFT, COMMON REGULATING AND CONTROL ELEMENTS, AND CHANGEOVER VALVE

[75] Inventor: Herbert Knepper, Brühl, Fed. Rep. of Germany

[73] Assignee: Klöckner-Humboldt-Deutz Aktiengesellschaft, Cologne, Fed. Rep. of Germany

[21] Appl. No.: 484,190

[22] Filed: Apr. 12, 1983

[30] Foreign Application Priority Data

Apr. 17, 1982 [DE] Fed. Rep. of Germany ....... 3214206

[51] Int. Cl.³ ............................................ A01B 63/112
[52] U.S. Cl. ........................................ 172/9; 172/300
[58] Field of Search ................... 172/2, 7, 9, 300, 301, 172/302, 810

[56] References Cited

U.S. PATENT DOCUMENTS

| | | | |
|---|---|---|---|
| 2,973,043 | 2/1961 | Elfes | 172/9 |
| 3,003,568 | 10/1961 | Merritt et al. | 172/9 |
| 3,048,981 | 8/1962 | Mark et al. | 172/9 X |
| 4,269,427 | 5/1981 | Van der Lely | 280/446 A |

Primary Examiner—Richard T. Stouffer
Attorney, Agent, or Firm—Becker & Becker, Inc.

[57] ABSTRACT

An apparatus for a tractor having a rear and front implement attachment mechanism. Each such mechanism has a hydraulic power lift which acts on it. The power lifts have in common a regulator and control device with a changeover valve. By activating this changeover valve, selectively one of the power lifts can be regulated in conformity with the provided adjustment features, such as the actual values of the position, of the cylinder pressure, etc., while at the same time the other power lift is connected with a control member for random influence of this last-mentioned power lift.

8 Claims, 1 Drawing Figure

U.S. Patent  Aug. 27, 1985  4,537,260
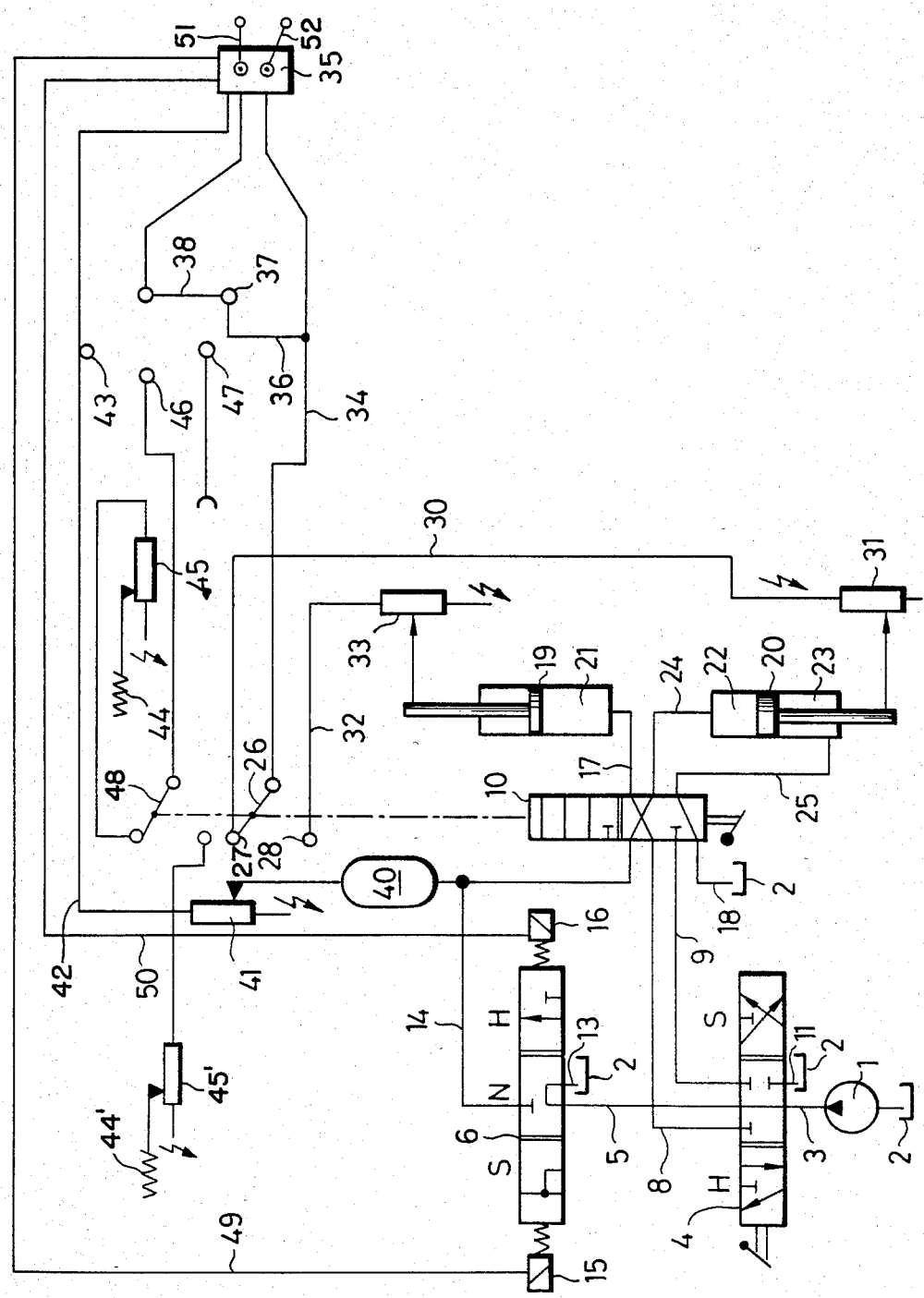

APPARATUS WITH REAR AND FRONT POWER LIFT, COMMON REGULATING AND CONTROL ELEMENTS, AND CHANGEOVER VALVE

BACKGROUND OF THE INVENTION

1. Field of the Invention

The present invention relates to an apparatus for a tractor having a rear and front implement attachment mechanism, i.e., devices for the attachment of tools or implements. Each such device has a hydraulic power lift coupled therewith for raising and lowering tools or implements. To actuate the rear power lift as a function not only of measured values, comparison values, and mixed values of the working resistance and the position of an implement or tool and/or of the cylinder pressure, but also of an arbitrary setting or adjustment, the rear power lift is connected with regulating and control elements. The front power lift is connected to a control element for random lifting and lowering of an implement or tool.

2. Description of the Prior Art

With a tractor having a rear implement attachment mechanism, the hydraulic power lift which acts thereon is controlled (by a regulator or controller which controls the pressure-medium supply thereof in conformity with values of position, of the working resistance of an implement, or of the pressure in the lifting cylinder of the power lift, such values being determined at actual value pickups) in such a way that a desired value which is fed to the adjusted or set adjustment feature, such value being for example for the working resistance of an implement, is essentially maintained during operation of the tractor without the assistance of the driver or operator. With some regulators or controllers of this type, it is also possible to mix determined actual values, for example actual values of the position and of the working resistance, in a predetermined or selectable ratio, which is generally known as mixed control.

Furthermore, it is also possible visually to control an implement by hand when this proves useful. Up to now it has been customary to manually control the implements provided for front attachment mechanisms. As a result however, depending upon the type and operation of the implement, and other effects, the driver or operator is from time to time so fully occupied thereby that he must devote his entire attention to guiding or controlling the implement or tool. The addition of a regulator or controller for the front implement attachment mechanism is, however, quite costly, since regulators or controllers of this type, and the corresponding systems, are very expensive.

It is therefore an object of the present invention to improve a tractor of the aforementioned general type, and having a regulatable and controllable rear implement attachment mechanism, as well as a controllable front implement attachment mechanism, without great cost, in such a way that the driver or operator, in addition to the given conditions for arbitrarily influencing the front implement, selectively also has the possibility of controlling or regulating the implement.

BRIEF DESCRIPTION OF THE DRAWING

This object, and other objects and advantages of the present invention, will appear more clearly from the following specification in connection with the accompanying drawing, which schematically shows one embodiment of an inventive switchable electro-hydraulic regulating and control apparatus which is provided for two power lifts.

SUMMARY OF THE INVENTION

The apparatus of the present invention is characterized primarily in that the front power lift, even for a single operation, for its regulation can be connected in common with regulating elements of at least a part of the regulating features which, for example, include position control, working resistance control, and cylinder pressure control of the rear power lift; and in that both power lifts have such regulating elements in common, and also have a common control element to which the lifting cylinders of the two power lifts can be connected by a changeover switch in such a way that one can be controlled and the other regulated, and vice versa.

These features provide the possibility, with the fewest means, to run one of two implements, which operate simultaneously on a tractor, according to one of the provided regulation features, while the other implement is controlled. This solution is entirely feasible not only for economical reasons, but also for practical considerations, since regulation of one implement is sufficient during operation of a tractor having two implements.

With a tractor where the hydraulic system, which is supplied from a hydraulic pump, has a manually adjustable control valve for random actuation, as well as a regulator or control valve which is influenced by a control unit operable, for example for processing transmitted measured values and which is intended for the automatic setting or adjustment of the power lift unit, it is proposed according to a further development of the present invention, that the control valve and the regulator be connected with the lifting cylinders of the two power lift units via a changeover valve which is constructed as a slide valve.

It is advantageous according to the present invention, with a tractor having electrical measured-value pickups for determining the actual position-values, if the changeover valve for the lifting cylinders is coupled with an electrical switch by means of which, upon actuation of the changeover valve, that actual-position-value pickup which is associated with the lifting cylinder which is in operation at any given time can be connected with the control unit.

It is furthermore useful within the scope of the present invention, and with a tractor having electrical measured-value pickups for determining the actual values of the working resistance, to couple the changeover valve for the lifting cylinders with a second electrical switch, by means of which, during actuation of the changeover valve, the actual value pickup for the working resistance of that power lift unit which is in operation at any given time can be connected with the control unit.

The measuring device for the actual value pickup of the cylinder pressure may furthermore advantageously be connected to the pressure line or conduit, which may be connected from the output side of the regulator or control valve, via the changeover valve, with the particular lifting cylinder under consideration.

According to another advantageous arrangement of the present invention, for processing the determined actual values of the position, of the working resistance or of the cylinder pressure, an electrical control unit having an electrical switch is provided for selecting the desired type of adjustment or regulation of the tool or implement, whereby the regulator or control unit is also electrically connected with the electromagnetic actuating elements (regulating units) of the regulator or control valve.

Finally, it is additionally expedient if a switch step also is provided on the circuit switch of the control unit for the input of external actual values which can come especially from an actual value pickup on a tool or implement.

DESCRIPTION OF A PREFERRED EMBODIMENT

Referring now to the drawing in detail, the illustrated hydraulic apparatus for the power lifts of devices on a tractor for the attachment of implements has a continuously operated pressure-medium pump 1, the suction side of which communicates with a storage or supply reservoir 2 for pressure or hydraulic fluid, and the pressure or delivery side of which communicates by means of a line or conduit 3 with a control or distribution valve 4, which is constructed as a slide valve. The control valve 4 can be manually actuated, and has three positions, with the middle starting position being illustrated. The other two positions are identified with H for lifting and S for lowering in conformity with their mode of operation. A line or conduit 5 leads from the control valve 4 to a control valve 6, which is also constructed as a slide valve. Two other lines or conduits 8 and 9 connect the control valve 4 with a changeover or switching valve 10, which is constructed as a slide valve. The control valve 4 furthermore communicates via a conduit or line 11 with the storage or supply reservoir 2. The control valve 6, in addition to the illustrated middle neutral position N additionally has the positions S for lowering and H for lifting. To further convey the hydraulic fluid supplied to the control valve 6 via the line or conduit 5, the control valve 6 communicates via a line or conduit 13 with the storage or supply reservoir 2, and via a continuation or extension line or conduit 14 with the changeover or switching valve 10. To actuate the control valve 6, electromagnetic regulating units 15 and 16 act on opposite sides of the control valve 6. The changeover valve 10 can be shifted manually into the two possible positions thereof, and additionally communicates with the storage or supply reservoir 2 via a line or conduit 18. In the hydraulic system presently described, a single-acting lifting cylinder 19 is provided for a rear power lift, and a double-acting lifting cylinder 20 is provided for a front power lift. In order to supply the lifting cylinder 19 with hydraulic fluid, the working chamber 21 thereof communicates with the changeover valve 10 via a line or conduit 17. The two working chambers 22 and 23 of the lifting cylinder 20 each likewise communicate with the changeover valve 10 via a respective line or conduit 24 or 25. The changeover valve 10 is operatively mechanically coupled with an electrical switch 26, which has two switching contacts 27 and 28. The switching contact 27 is connected via a line 30 with an electrical pickup 31 for the actual values of the position of a front implement or tool. Similarly, the switching contact 28 is connected via a line 32 with an electrical pickup 33, which continually determines actual values of the position of a tool or implement located at the rear. A line 34 leads from the switch 26 to an electrical control unit 35, while a line 36 connects the line 34 with a switching contact 37 of a circuit switch 38. A measuring device 40 for the pressure in the lifting cylinder 19 or 20, which at any given time is being provided for control, is connected to the line or conduit 14 and has an electrical actual value pickup 41, which is connected via a line 42 not only with a switching contact 43 of the circuit switch 38, but also with the control unit 35. Additionally, for the actual values of the working resistance of a front implement or tool, an electrical measuring device 44 is provided which has an actual value pickup 45 that in turn has a switching contact 46 on the circuit switch 38. For the actual values of the working resistance of a rear implement or tool, an electrical measuring device 44' having an actual value pickup 45' is provided, with the latter also being connectible to the switching contact 46. To determine accurate measuring values, it is expedient to provide separate measuring points for the actual values of the working resistance for a rear implement and for a front implement. In this event, a second switch 48, actuated by the changeover valve 10, can be arranged parallel to the switch 26; this second switch 48 feeds to the control unit 35 the actual values of the working resistance of the implement which may at any given time is in operation by appropriate setting of the circuit switch 38. A further switching contact 47 on the circuit switch 38 serves for feeding external actual values, such as those which might originate from an actual value pickup arranged directly on the tool or implement. Two electrical lines 49 and 50 additionally lead from the regulator or control unit 35, for transmitting the control pulses, to the electromagnetic regulating units 15 and 16 on the control valve 6. Finally, a desired-value setting means 51 is also provided at the electrical control unit 35. The value desired at any given time for the selected type of control or adjustment can be set at this setting means.

The operation of the described apparatus is as follows: with the illustrated position of the control valve 4, the hydraulic fluid conveyed by the pressure-medium pump 1 passes through the conduits 3,5 and 13 directly back to the reservoir 2. If now there proceeds a change of position of the tool or implement due to adjusting the position of the front power lift unit by switching the illustrated position of the circuit switch 38 and of the changeover valve 10, then the actual value of the position, as transmitted by the actual value pickup 31 to the control unit 35, consequently changes relative to the introduced desired value. The control unit 35 consequently provides for shifting the control valve 6 in the direction of lifting or lowering in conformity with the deviation from the desired value, so that by appropriate shifting of the lifting cylinder 20, a change of the position of the tool or implement occurs for correcting the preceding deviation.

The lifting cylinder 19 or 20, which is provided for adjustment in conformity with one of the given adjustment features, can be connected with the control valve 6 via the changeover valve 10. When the changeover valve 10 is shifted, the switch 26 is always actuated, so that as a result, the actual position-value pickup 31 or 33 associated with the corresponding lifting cylinder 19 or 20 becomes connected with the control unit 35. The circuit switch 38 is connected with the switching contact 43 to adjust or regulate the rear or front power lift unit in conformity with the pressure in that lifting cylinder 19 or 20 which is actuated at any given time by the changeover valve 10. As a result, the values detected at the actual-value pickup 41 for the cylinder pressure pass through the line 42 to the control unit 35, which in turn regulates the control valve 6 for supplying the connected lifting cylinder 19 or 20 with hydraulic fluid as a function of the control pulses.

If, on the other hand, the circuit switch 38 is connected with the switching contact 46, then the actual values of the working resistance of a connected tool or implement pass from the pickup 45 into the control unit 35. Control or regulating pulses from the control unit 35 regulate the control valve 6, which consequently controls or regulates the hydraulic-medium supply or withdrawal of the lifting cylinder 19 or 20 connected via the changeover valve 10.

The electrical lines 34 and 42 on the one hand are connected directly with a respective switching contact 37 or 43, and on the other hand are connected with the control unit 35. This provides the possibility of being able to undertake in the control unit 35, by actuating a control lever 52, a mixed control or regulation between the actual values of the cylinder pressure and the actual values of the position. However, it is also conceivable to include the incoming actual values of the working resistance of a tool or implement when setting the control unit 35 for mixed control or regulation with corresponding setting of the circuit switch 38.

The changeover valve 10 is connected in the system in such a way that with it on the one hand the lifting cylinder 19 or 20 of the corresponding power lift unit can be shifted. The lifting cylinders are provided for regulation or adjustment in conformity with one of the possible adjustment features. On the other hand, that lifting cylinder 19 or 20 which at any given time is not connected with the control valve 6 for adjustment or regulation, is connected by means of the changeover valve 10 with the control valve 4 for controlling a connected tool or implement. In this way, the possibility is provided with the described hydraulic system that during operation of a tractor having a rear and front tool or implement, one of the implements can be regulated while the other can be controlled simultaneously therewith.

The present invention is, of course, in no way restricted to the specific disclosure of the specification and drawing, but also encompasses any modifications within the scope of the appended claims.

What I claim is:

1. In an apparatus having coupled therewith a rear and a front hydraulic power lift for raising and lowering implements, with each power lift including a lifting cylinder; actuation of the rear power lift being a function of not only pick-up determined measurement of values of respectively working resistance and position, comparison values of respectively working resistance and position, and mixed values of respectively working resistance and position of an implement as well as cylinder pressure, but also of random setting of the rear power lift; said apparatus having the improvement therewith comprising function regulating elements in common for the rear and the front power lifts, an operation control element in common for the rear and the front power lifts, and a changeover valve in common with both of said lifting cylinders for effecting actuation of the rear power lift as a function of the aforementioned values, and for effecting actuation of the front power lift, even for a single operation, as a function of at least one of said aforementioned values also applicable for operation said rear power lift; said lifting cylinders of said power lifts being connectible with said regulating elements and said control element, respectively via intervention of said changeover valve, in such a way that one of said lifting cylinders can be controlled as to operation while the other lifting cylinder can be regulated as to function, and vice versa.

2. An apparatus according to claim 1, which includes a hydraulic system supplied by a hydraulic pump, said common control element, which is a first control valve, being a part of said system and being manually adjustable for random actuation; said common regulating elements also being a part of said system and including a control unit for processing determined measured values, and a second control valve which is influenced by said control unit for automatic adjustment of said power lifts; and in which said changeover valve is in the form of a slide valve by means of which said first and second control valves can be connected with said lifting cylinders of said power lifts.

3. An apparatus according to claim 2, which includes two electrical measured-value pickups, one associated with each of said lifting cylinders, for determining the actual position-values; and in which said changeover valve for said lifting cylinders is coupled with an electrical switch by means of which, upon actuation of said changeover valve, that actual-position-value pickup which is associated with the lifting cylinder which is in operation at any given time can be connected with said control unit.

4. An apparatus according to claim 3, which includes further electrical measured-value pickups for determining the actual values of the working resistance; and in which said changeover valve for said lifting cylinders is coupled with a further electrical switch, by means of which, upon actuation of said changeover valve, the further actual-value pickup for the working resistance of that power lift which is in operation at any given time can be connected with said control unit.

5. An apparatus according to claim 3, which includes a pressure line which leads from the output side of said second control valve to said changeover valve for said lifting cylinders; which includes an actual-value pickup for cylinder pressure; and which includes a measuring device for said actual cylinder-pressure-value pickup, said measuring device being connected to said pressure line.

6. An apparatus according to claim 5, which includes electromagnetic actuating elements for said second control valve; in which said control unit is an electrical control unit for processing determined actual values of position, working resistance, and cylinder pressure; and which includes an electrical circuit switch associated with said control unit for selecting the desired control values of an implement; said control unit also being electrically connected with said actuating elements of said second control valve.

7. An apparatus according to claim 6, in which said circuit switch of said control unit includes a switch step for the input of external actual values.

8. An apparatus according to claim 7, which includes an actual value pickup which may be associated with an implement for providing said external actual values to said switch step.

* * * * *